W. PACK.
MAGAZINE FILM AND PLATE HOLDER FOR CAMERAS.
APPLICATION FILED JAN. 29, 1921.
1,419,406.
Patented June 13, 1922.
4 SHEETS—SHEET 1.
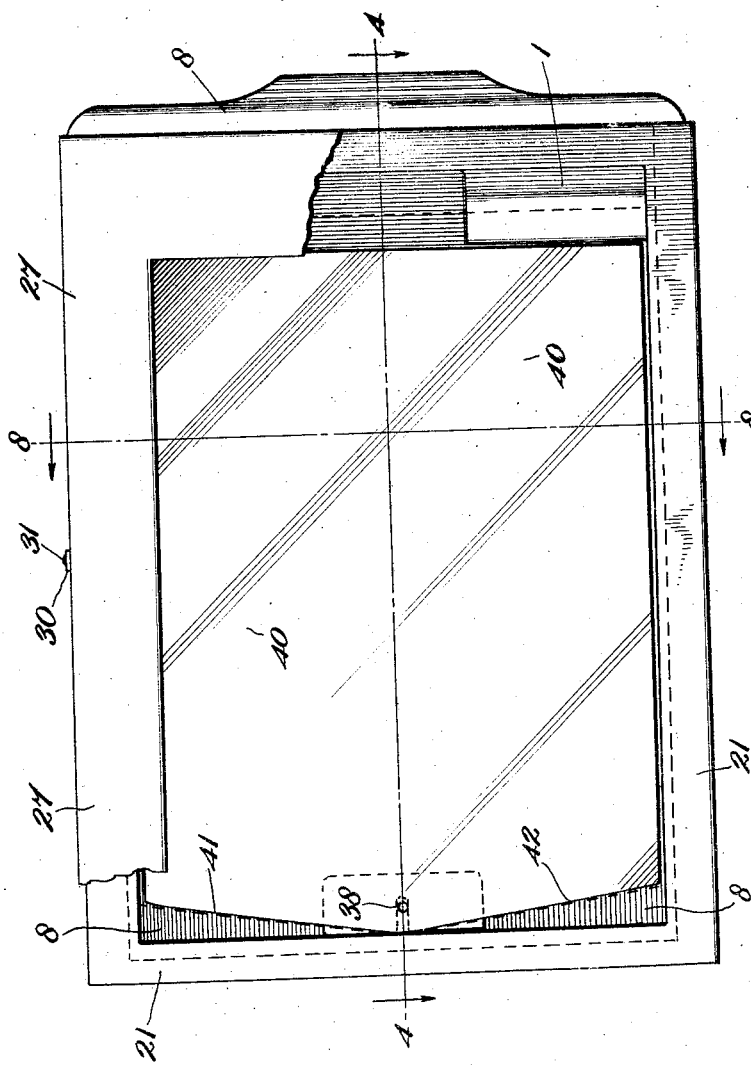
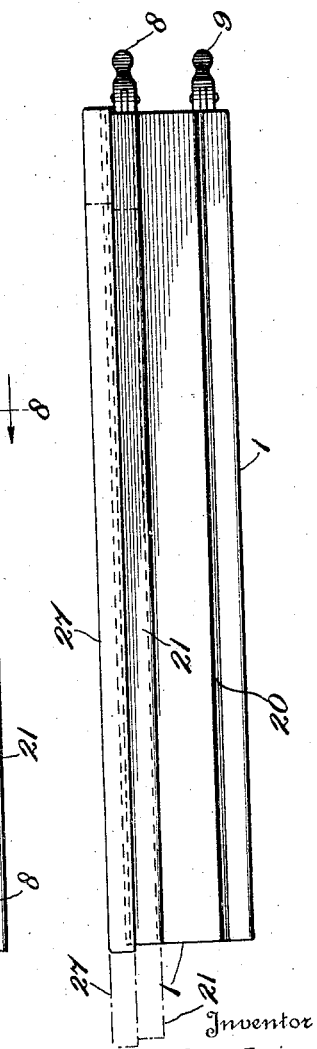
Inventor
Walter Pack, W. PACK.
MAGAZINE FILM AND PLATE HOLDER FOR CAMERAS.
APPLICATION FILED JAN. 29, 1921.

1,419,406.

Patented June 13, 1922.
4 SHEETS—SHEET 2.

Inventor

Walter Pack,

By T. A. Witherspoon

Attorney

W. PACK.
MAGAZINE FILM AND PLATE HOLDER FOR CAMERAS.
APPLICATION FILED JAN. 29, 1921.
1,419,406.
Patented June 13, 1922.
4 SHEETS—SHEET 3.
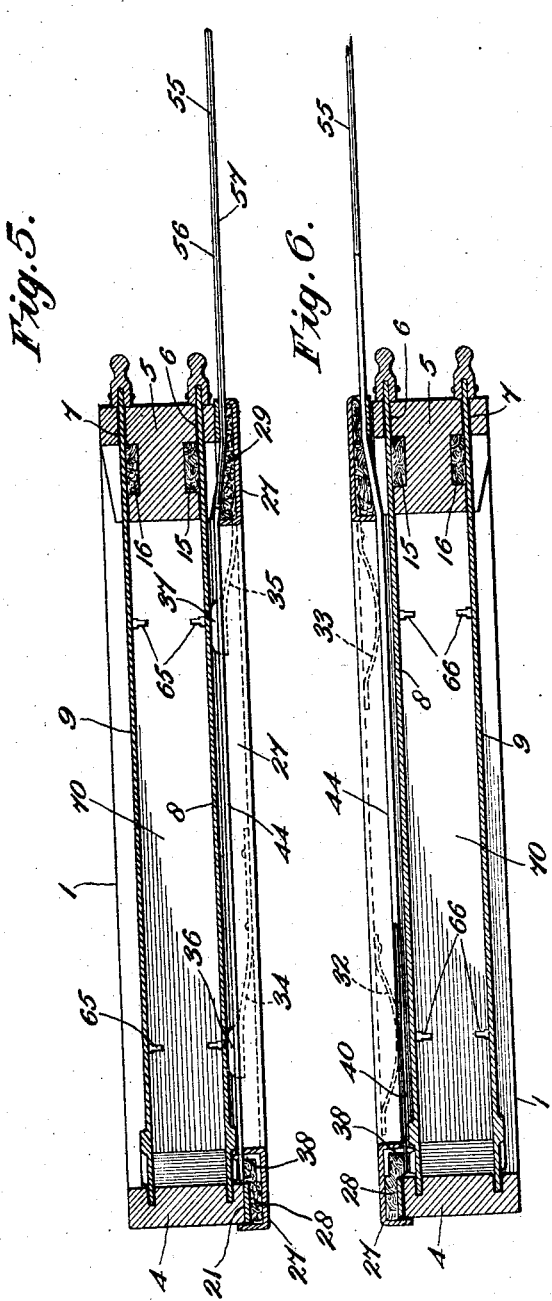
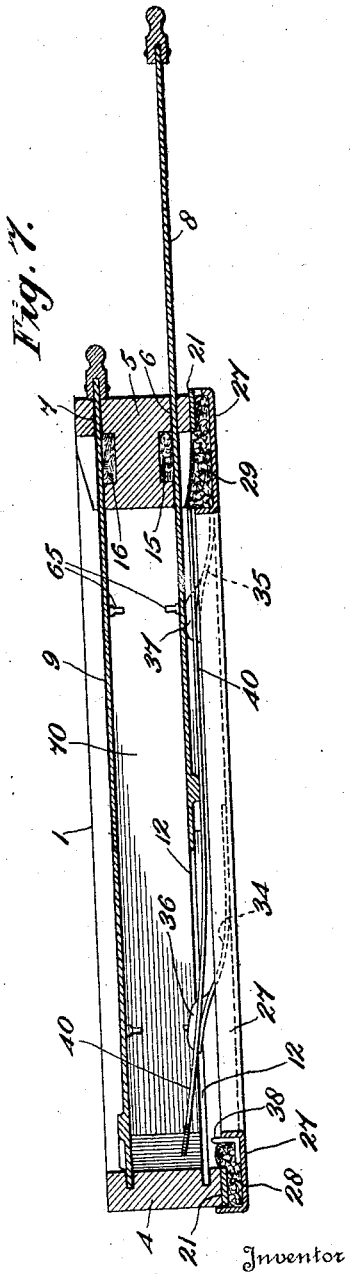
Inventor
Walter Pack,
By T. A. Witherspoon
Attorney W. PACK.
MAGAZINE FILM AND PLATE HOLDER FOR CAMERAS.
APPLICATION FILED JAN. 29, 1921.
1,419,406.
Patented June 13, 1922.
4 SHEETS—SHEET 4.
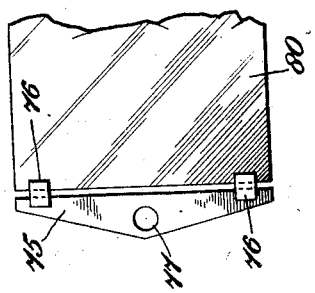
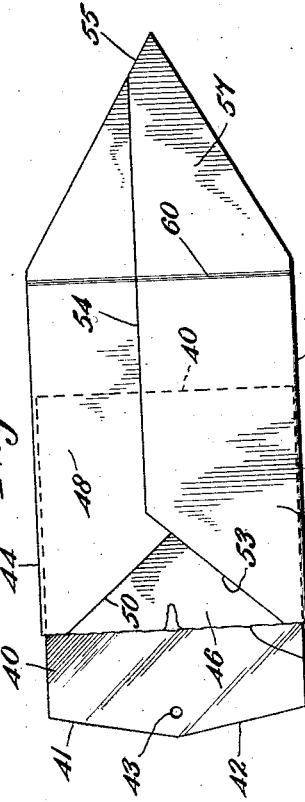
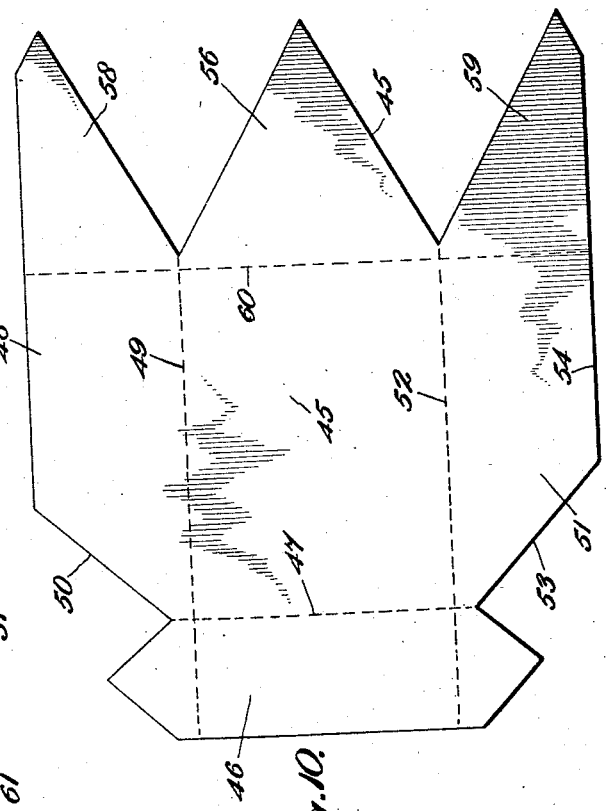
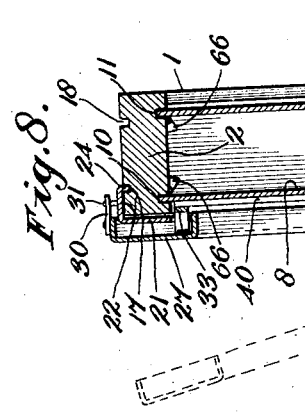
Inventor
Walter Pack,
T. A. Witherspoon
By
Attorney

UNITED STATES PATENT OFFICE.

WALTER PACK, OF TAKOMA PARK, MARYLAND, ASSIGNOR TO CHARLES A. ROGERS, OF HARTFORD, CONNECTICUT.

MAGAZINE FILM AND PLATE HOLDER FOR CAMERAS.

1,419,406.  Specification of Letters Patent. Patented June 13, 1922.

Application filed January 29, 1921. Serial No. 441,019.

*To all whom it may concern:*

Be it known that I, WALTER PACK, a citizen of the United States, residing at Takoma Park, in the county of Montgomery and State of Maryland, have invented certain new and useful Improvements in Magazine Film and Plate Holders for Cameras; and I do hereby declare the following to be a full, clear, and exact description of the invention, such as will enable others skilled in the art to which it appertains to make and use the same.

This invention relates to magazine film and plate holders for cameras, and has for its object to provide a photographic accessory of this character which will be simple in construction, comparatively inexpensive to manufacture, and more efficient in use than those heretofore proposed.

With these and other objects in view the invention consists in the novel details of construction and combinations of parts constituting the film and plate holder, and all as will be more fully hereinafter disclosed and particularly pointed out in the claims.

Referring to the accompanying drawings forming a part of this specification in which like numerals designate like parts in all the views:

Figure 1 is a diagrammatic elevational view partly broken away of one form of film and plate holder made in accordance with the present invention, with a film in position for exposure, and as seen from the front of the camera;

Figure 2 is an inverted plan view of the parts shown in Figure 1;

Figure 3 is an elevational view of the hinged portion of the removable frame illustrated in Figures 1 and 2, looking in the direction opposite to Figure 1;

Figure 4 is a horizontal sectional view, taken on the line 4—4 of Figure 1, looking down;

Figure 5 is a view similar to Fig. 4, showing a film package in place in the holder, with the light tight envelope which normally encloses the film prior to exposure about to be removed;

Figure 6 is a view similar to Figure 5, but looking in the opposite direction, showing the light tight envelope partially removed;

Figure 7 is a view similar to Figure 5, illustrating the dark slide partially pulled out after the exposure and the exposed film entering the magazine;

Figure 8 is a vertical sectional view taken on the line 8—8 of Figure 1, looking in the direction of the arrows;

Figure 9 is a diagrammatic elevational view of a film package especially adapted to be employed with the present holder, illustrating the light tight envelope partially removed;

Figure 10 is a diagrammatic plan view of the paper blank used in making the light tight envelope; and, Figure 11 is a fragmentary elevational view of a slight modification employed in adapting a glass plate for use with the form of envelope disclosed in Figures 9 and 10.

Referring more especially to Figures 1 to 8, inclusive, 1 indicates the frame of the magazine, comprising the top and bottom members 2 and 3 respectively and the side members 4 and 5. The side member 5 is provided with a pair of slits or apertures 6 and 7, through which are adapted to slide the metallic dark slides 8 and 9 respectively, working in the grooves 10 and 11 in the member 2 and the grooves 12 and 13 in the member 3. The member 5 is also provided with the light seals 15 and 16, of felt, velvet, or other suitable material, bearing against the slides 8 and 9, as will be clear from Figures 4, 5, 6, and 7, and the entire frame 1, together with the said slides 8 and 9 comprises a light tight receptacle or magazine for the reception and retention of a number of exposed films or plates, as will presently appear.

The member 2 is provided with a pair of grooves 17 and 18 extending its full length, and the member 3 is likewise provided with a pair of companion grooves 19 and 20 extending its full length. 21 indicates a hollow rectangular detachable frame, of stamped aluminum or other suitable material, provided with the angularly disposed top and bottom members 22 and 23, having the bent tongues 24 and 25 respectively, adapted to enter either the pair of grooves 17 and 19, or the pair of grooves 18 and 20, for the purpose of securing the member 21 to the magazine frame 1.

Secured to the detachable frame 21 as by the hinges 26 is the swinging door or retaining member 27, preferably of stamped aluminum or other suitable material, and shaped substantially as shown. The said member 27 is provided on its inner side along two of its edges with the felt or velvet light seals 28 and 29, and it is also provided with a catch member 30, adapted to engage with a companion catch member 31 carried by the detachable frame 21. The member 27 also has secured to its inner side the upper spring members 32 and 33, as well as the lower spring members 34 and 35, which latter are provided with the angularly disposed extensions 36 and 37 respectively, and the said member 27 is further provided with a pin or projection 38, for a purpose which will appear more fully below.

40 designates the sensitized element such as a film which is provided with the angularly disposed edges 41 and 42, and with a small perforation 43, see Figure 9. The said sensitized element is normally enclosed before exposure in a light tight envelope 44 of prepared paper or other suitable material, preferably folded from a blank 45 such as that shown in Figure 10.

In preparing this envelope the member 46 of the said blank is first folded over along the dotted line 47, whereupon the member 48 is folded over in the same direction along the dotted line 49, and its edge 50 secured in any suitable manner, as by adhesives, to the member 46. In like manner, the member 51 is folded over along the dotted line 52 upon the member 48, and its edges 53 and 54 secured by adhesives to the members 46 and 48 respectively. This produces a package having a pointed tab 55, as seen in Figure 9, comprising a lower member 56 and an upper member 57 composed of the pointed ends 58 and 59 of the members 48 and 51. The inner surfaces of the members 56 and 57 may be secured together by adhesive after the sensitized element has been inserted in the envelope by the manufacturer, and the tab 55 is folded over along the line 60, and there is thus provided a completely closed light tight inclosure for the element 40.

This said envelope is specifically described and claimed in my copending divisional application, Serial No. 483,764, filed July 11, 1921, and entitled "Sensitized element package for photographic apparatus."

The mode of using the present plate and film holder with the ordinary plate or flat film camera will be readily apparent from the foregoing, but may be briefly summarized as follows:

Supposing the parts to be in the positions illustrated in the drawings, wherein they are shown as arranged for use with films, the door 27 is first swung back to approximately the dotted line position shown in Figure 8 whereupon a package such as 44 containing sensitized film such as 40 is placed upon the inner surface of the said member 27 with its lower edge resting upon the angular extensions 36 and 37 of the spring members 34 and 35 carried by the said swinging member 27, the tab 55 of the said package being unfolded to a position similar to that illustrated in Figure 9. The hinged member 27 is thereupon snapped back to its full line position as seen in Figure 8, the catch member 30 thereof engaging the catch member 31 of the detachable frame 21, whereupon the pin or projection 38 carried by the movable member 27 will penetrate through the dark paper envelope 44 passing through the perforation 43 in the film 40.

At the same time the spring members 32, 33, 34 and 35 carried by movable member 27 will engage the surface of the envelope 44 forcing it to the right, as seen in Figure 8, into contact with the dark slide 8.

The device is then ready for insertion into the camera in the manner customarily employed with the ordinary plate holders and after it has been so placed therein the sensitized element such as 40 which has up to this time been completely protected from light by reason of its light tight envelope 44 is finally prepared for the exposure.

This is accomplished by grasping the tab 55 of the envelope 44, which will project out to one side of the camera somewhat after the manner of the well known film packs, and pulling upon the same. The pin 38 carried by the member 27 having passed through the perforation 43 of the film 40 will hold the same, preventing movement thereof while it will tear through the relatively thin paper envelope as indicated in Figure 9. The angularly disposed edges 41 and 42 of the film 40 will serve to cut the end 61 of the envelope 44 somewhat after the manner of a knife thus permitting the envelope to be withdrawn from the film and leaving it in a position in the plate holder to be subjected to the action of light from the camera lens.

The envelope 44 after it has been withdrawn may be discarded since it has served its purpose and is no longer required.

After the exposure has been made by opening and closing the shutter of the camera in the usual manner, the dark slide 8 is pulled toward the right as indicated in Figure 7 and as it progresses in this direction the spring members 32, 33, 34, and 35 will force the film back behind the said dark slide 8 until the latter has reached its furthermost position.

When this relation of parts is had, the film 40 will be entirely above the slide 8 as seen in Figure 7, whereupon when the slide is again returned to its initial position as seen in Figures 5 and 6, the film will have entered into the magazine between the slides 8 and 9 where it may be retained completely protected from light until such time as it may be convenient to remove it therefrom in a dark room for the purpose of development.

Suitable spring controlled members such as 65 and 66 may be provided upon the members 2 and 3 for the purpose of preventing films which have been deposited in the magazine 70 from falling into the grooves such as 12 when the dark slide 8 is again moved toward the right to permit the entrance of a succeeding film.

It will be noted that during the time the film is in front of the slide 8 it rests upon the angular extensions 36 and 37 of the spring members 34 and 35 which members serve to carry the lower edge of the film behind the slide 8 when it is withdrawn.

It therefore results that since the extensions 36 and 37 are above the groove 12 the film as it is moved back into the magazine cannot engage or become caught in the said groove 12. Of course, as the slide 8 is returned to its initial position it will engage the said spring members 32, 33, 34 and 35 and return them to their original positions in front of the dark slide, while at the same time leaving the film itself within the magazine 70.

Some photographers prefer the use of the flat films illustrated in Figures 1 to 9 of the drawings, while others prefer the use of the well known glass plates, and I have made provision in the present invention whereby either form of sensitized element may be employed.

That is to say, it will be noted from Figure 8 of the drawings that the longitudinal grooves 17 and 19 with which the members 2 and 3 are provided and into which slide the tongues 24 and 25 of the detachable frame 21 are spaced somewhat farther from the edge of the said members 2 and 3 than are the grooves 18 and 20, provided near the other edge of the said members.

It therefore results that if the detachable frame 21 together with its associated parts such as the hinged member 27, is slid out of the grooves 17 and 19 and into the grooves 18 and 20, the distance between the dark slide 9 and the edge of the said frame will be slightly greater.

This distance may be made equal to the difference in thickness between the usual flat film employed and that of the ordinary glass plate so that by simply reversing the position of the frame 21 and its associated parts with respect to the frame 1, glass plates may be used in precisely the same manner as the celluloid films heretofore described.

When using plates, however, it is not practical to bevel the ends thereof as is done in the case of the films, and therefore, I propose to accomplish the same result by attaching to one of the square ends of the plate a small metallic member 75 (see Figure 11) by means of suitable stickers or holding members 76 of paper, cloth, or other suitable material.

The operation when using this form of the invention would be substantially the same, the plate package being first inserted upon the angular extensions 36 and 37 of the spring members 34 and 35, the hinged member 27 being closed, whereupon its pin 38 will penetrate through the paper envelope 44 and through the perforation 77 with which the member 75 is provided, precisely the same as it did in the case of the film 40.

The enclosing envelope 44 may thereupon be withdrawn in the same manner, the beveled edges of the member 75 serving to cut the end of the envelope 44 as above described, while the pin 38 serves to retain the member 75 and the plate 80 within the holder.

The envelope 44 having been removed, the camera is operated in the usual manner, whereupon the dark slide 9 may be withdrawn as was disclosed in connection with the slide 8, the spring members 32, 33, 34 and 35 forcing the plate 80 behind the slide, whereupon when the slide is returned to its initial position it will shear or cut the paper tabs 76 holding the plate to the metallic member 75 which latter has been held in front of the slide by the frames 27 and 21. This said member may be removed by hand when the door 27 is again opened.

It will thus be observed that I have provided a magazine such as 70 which may be made of any suitable dimensions and which is adapted to receive the exposed films or plates and to retain them in a light tight condition for an indefinite period of time.

With the prior plate holders, the capacity has of necessity been limited to relatively very few plates. Therefore it was necessary for the photographer to return to a dark room, withdraw his exposed plates, refill the holders with fresh ones and then start out again.

In the present invention, however, any desired number of sensitized element packages such as shown in Figure 9 may be slipped into the pocket of the operator; they may be inserted one at a time in the holder, and after the exposure has been made, they can be readily deposited within the magazine 70 to be there retained as long as may be necessary.

As above pointed out, the magazine 70 may be made of almost any dimensions, so that in actual practice it may be possible to provide space for a very large number of exposed films or plates, thus obviating the necessity for frequent trips to the dark room to change unexposed for exposed elements.

It is obvious that those skilled in the art may vary the details of construction as well as the arrangement of parts without departing from the spirit of the invention, and therefore it is not desired to be limited to the above disclosure except as may be required by the claims.

What I claim is:

1. In a sensitized element holder for cameras the combination of a magazine frame member; slidable means associated with said frame adapted to form a light tight magazine; means adapted to receive and hold a sensitized element outside said magazine; and means for transferring said element from said holding means to said magazine, substantially as described.

2. In a magazine plate holder for cameras the combination of a magazine frame; a dark slide associated with said frame; a second detachable frame carried by said magazine frame; means carried by said second frame adapted to hold a sensitized element against movement; and means adapted to cause said element to enter said magazine when said dark slide is withdrawn, substantially as described.

3. In a magazine plate holder for cameras the combination of a magazine frame; a dark slide associated with said frame; a second detachable frame carried by said magazine frame; a swinging member pivotally connected to said detachable frame; means carried by said swinging member adapted to receive and hold a sensitive element in position for exposure before said dark slide and to move said element into said magazine when said slide is withdrawn after exposure; and means adapted to prevent lateral movement of said element while in front of said slide, substantially as described.

4. In a magazine holder for cameras the combination of a magazine frame, a dark slide associated with said frame; a second detachable frame carried by said magazine frame; a swinging member pivotally connected to said detachable frame; resilient means carried by said swinging member adapted to receive and hold a sensitized element and its enclosing envelope in position before said dark slide, and to move said element into said magazine when said slide is withdrawn; and means adapted to penetrate said envelope and sensitized element and to hold the latter against lateral movement while the former is withdrawn, substantially as described.

5. In a magazine holder for cameras the combination of a magazine frame provided with grooves; a dark slide associated with said frame; a second detachable frame provided with tongues adapted to engage the grooves of said magazine frame; a swinging member pivotally connected to said detachable frame; resilient means carried by said swinging member adapted to receive and hold a sensitized element and its enclosing envelope in position before said dark slide, and to move said element into said magazine when said slide is withdrawn; and means adapted to penetrate said envelope and sensitized element and to hold the latter against lateral movement while the former is withdrawn, substantially as described.

6. In a sensitized element holder for photographic apparatus the combination of a main frame; a pair of slidable members carried by said frame adapted to coact therewith to form a light-tight magazine; means for receiving and holding a sensitized element, adapted to be detachably secured in cooperative relation to either of said slidable members at will; and means associated with said holding means adapted to transfer said element therefrom to said magazine when one of said slidable members is withdrawn, substantially as described.

7. In a sensitized element holder for photographic apparatus the combination of a main frame provided with a plurality of sets of grooves; a pair of slidable members carried by said frame, adapted to coact therewith to form a light-tight magazine; means for receiving and holding a sensitized element provided with means for engaging said sets of grooves, whereby it is adapted to be detachably secured in cooperative relation to either of said slidable members at will; and means associated with said holding means, adapted to transfer said element therefrom to said magazine when one of said slidable members is withdrawn, substantially as described.

8. In a sensitized element holder for photographic apparatus the combination of a main frame; a pair of slides carried by said frame, adapted to coact therewith to form a light-tight magazine; a second frame adapted to receive and hold a sensitized element; means for securing said second frame to said first frame in cooperative relation to either of said slides, said means being adapted to secure said second frame in closer proximity to one of said slides than to the other, whereby elements of varying thicknesses may be accommodated; and means for transferring said elements from said second frame to said magazine when one of said slides is withdrawn, substantially as described.

9. In a sensitized element holder for photographic apparatus the combination of a main frame provided with two sets of grooves spaced different distances from the opposite faces of said frame; a pair of slides carried by said frame adjacent said faces, and adapted to form with said frame a light-tight magazine; a second frame adapted to receive and hold a sensitized element, and provided with means for engaging said sets of grooves, whereby it may be secured to said main frame in closer proximity to one of said slides than to the other, to accommodate elements of different thicknesses; and means carried by said second frame for transferring said elements therefrom to said magazine when said slides are operated, substantially as described.

10. In a sensitized element holder for photographic apparatus the combination of a main frame; a pair of slides carried by said frame, adapted to form therewith a light-tight magazine; a second frame adapted to receive and hold a sensitized element and its enclosing envelope; means for securing said second frame to said main frame in closer proximity to one of said slides than to the other, whereby elements of different thicknesses may be accommodated; means for penetrating said element and envelope, and holding the former while the latter is removed; and means for transferring said element from said second frame to said magazine, substantially as described.

11. In a sensitized element holder for photographic apparatus the combination of a main frame; a pair of slides carried by said frame, adapted to form therewith a light tight magazine; a second frame adapted to receive and hold a sensitized element and its enclosing envelope; means for securing said second frame to said main frame in closer proximity to one of said slides than to the other, whereby elements of different thicknesses may be accommodated; means for penetrating said element and envelope, and holding the former against lateral movement while the latter is removed; and resilient means carried by said second frame for transferring said element from said second frame to said magazine, substantially as described.

12. In a sensitized element holder for photographic apparatus the combination of a main frame; a pair of slides carried by said main frame, adapted to form therewith a light-tight magazine; a second frame adapted to be secured to said main frame in cooperative relation with either of said slides; means whereby said second frame may be secured to said main frame in closer proximity to one of said slides than to the other, to accommodate elements of different thicknesses; a swinging member pivotally secured to said second frame, adapted to provide for the ready insertion therein of a sensitized element and its enclosing envelope; means associated with said second frame for penetrating said element and envelope; and holding the former against lateral movement while the latter is withdrawn; and resilient means carried by said second frame for transferring said element therefrom to said magazine when one of said slides is operated, substantially as described.

In testimony whereof I affix my signature.

WALTER PACK.